United States Patent [19]

Collins et al.

[11] Patent Number: 4,630,150

[45] Date of Patent: Dec. 16, 1986

[54] OPTICAL TOOL FOR ALIGNING TRANSDUCER HEAD ASSEMBLIES

[75] Inventors: David W. Collins, Rochester; Joel S. Johnson, Plainview; Laurence J. Schmidt, Rochester; Michael M. Siverling, Rochester; William S. Wentink, Rochester, all of Minn.

[73] Assignee: International Business Machines Corporation, Armonk, N.Y.

[21] Appl. No.: 597,891

[22] Filed: Apr. 9, 1984

[51] Int. Cl.⁴ .............................................. G11B 5/012
[52] U.S. Cl. .................................... 360/97; 33/180 R; 356/399; 360/109
[58] Field of Search .................................... 360/97–99, 360/109; 356/399; 33/180 R, 181 R, 276

[56] References Cited

U.S. PATENT DOCUMENTS

| | | | |
|---|---|---|---|
| 2,247,113 | 6/1941 | Benford | 356/399 X |
| 3,781,489 | 12/1973 | Brand | 360/109 X |
| 3,914,793 | 10/1975 | Burnham | 360/109 X |
| 4,537,509 | 8/1985 | Kronfeld | 356/399 |

Primary Examiner—A. J. Heinz
Attorney, Agent, or Firm—Robert W. Lahtinen

[57] ABSTRACT

An optical tool is disclosed which permits a sequence of aligned transducer gaps to be positioned parallel to the axis of a disk file. The tool is surfaced with transparent material, has a thickness the same as the disk or disks of a disk stack being simulated and presents an etched alignment grid at the interface surface between transducer and tool. The virtually common plane of the transducer gap and etched grid substantially eliminates parallax and the unfilled etched grid permits the gap to be seen, whether aligned with the transparent unetched surface or the translucent etched surface portion. The use of inclined mirrored surfaces underlying the grid permits alignment to be effected using a bright field microscope and observing from a direction rotated 90 degrees from a line perpendicular to the grid to enable alignment of transducer gaps confronting one another at opposite sides of the disk.

13 Claims, 7 Drawing Figures

OPTICAL TOOL FOR ALIGNING TRANSDUCER HEAD ASSEMBLIES

BACKGROUND OF THE INVENTION

This invention pertains to data storage disk files and more particularly to a structure and method for the precision alignment of transducer heads with respect to each other and the storage media surface.

A magnetic disk file is initialized by servowriting the surfaces of the disks to provide permanent data relating to the tracks, sector identification and servo data for seek and track follow. These functions are performed during the build process by a servowriter that must function with a high precision of head orientation, disk angular position and disk speed. Using a two disk sector servo file as an example, the servowriting device has a pair of speed heads with a precise angular separation on a common track to determine the rotational speed as a signal is sequentially sent by one head and received by the other. A clock head receives signals from a clock track that it precisely written to divide the disk into precision angular increments. Finally, four aligned servo write heads in two opposing pairs confront the disk surfaces and are used to write the permanent data consecutively track by track across all the disk surfaces.

To enable maximum areal densities, it is important that the servowriting be done with the greatest precision that the state of the art will allow. This requires precise alignment of the transducer heads and frequent inspection and readjustment of head position to assure that exacting dimensional specifications are maintained.

This has commonly been accomplished using a master servowriter to create standard files that are used to certify production servowriters each day to assure proper gap alignment. This method has limitations in providing only an indirect sensing of head gap alignment and the obvious possibility that damage or maladjustment may occur with respect to the master servowriter or the standard files. It has been possible to align heads with respect to the surface of a glass disk or plate by viewing from the opposite side with respect to a grid found upon the glass surface which confronts the transducer gap. This approach is shown in U.S. Pat. No. 3,681,489. In actual practice many critical transducer gap locations are not accessible from the opposite surface and servo write heads which are aligned to write opposite surfaces on a common disk are never so accessible.

SUMMARY OF THE INVENTION

The optical tool of the present invention provides for viewing the alignment of a transducer gap with respect to an etched grid from a position radially outward of the disk location. The structure enables the viewing of either single transducer gaps or aligned transducer head gaps positioned at opposite surfaces of a single disk. This permits all heads on a given device to be exactingly aligned as to position and attitude with respect to one another. Since the alignment is effected using a microscope and a very small grid, problems may be encountered in locating the grid for observation. To enable the grid to be more easily located, a few lines of the grid are extended so that an observer may find and follow such extended lines to locate the grid.

DETAILED DESCRIPTION

Figure 1:
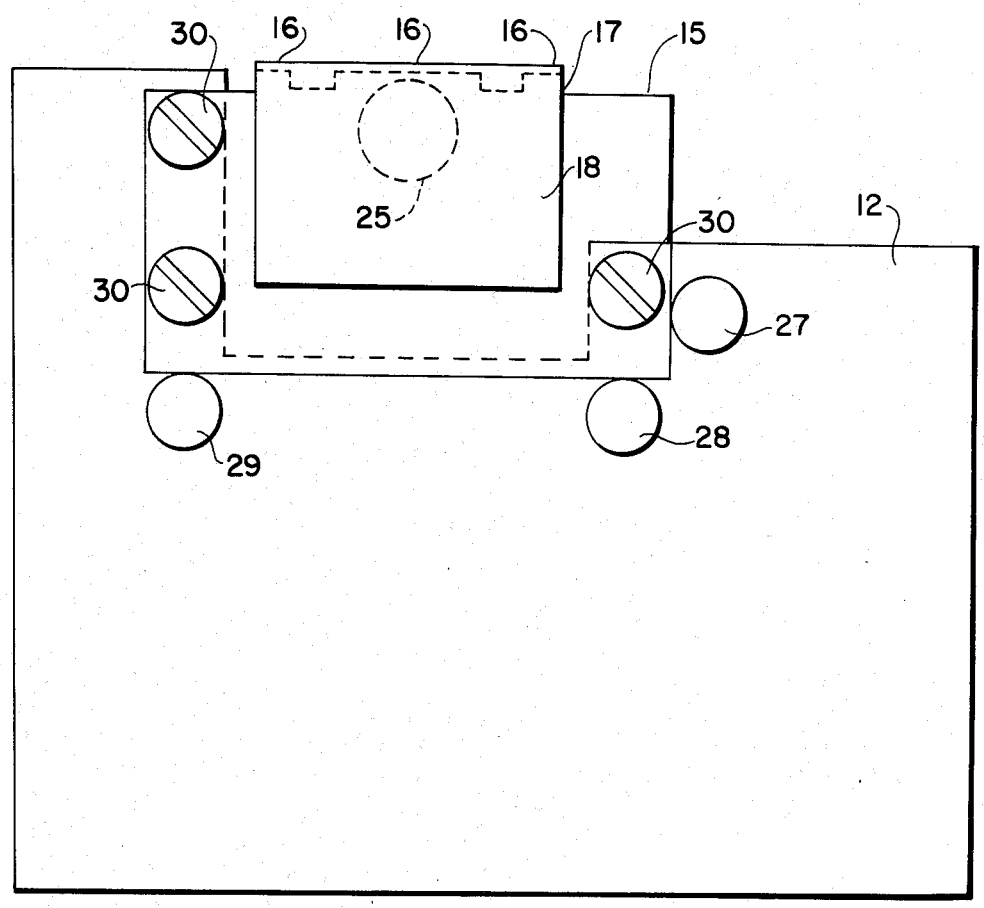
FIG. 1 is a plan view of the optical tool assembly of the present invention.
Figure 2:
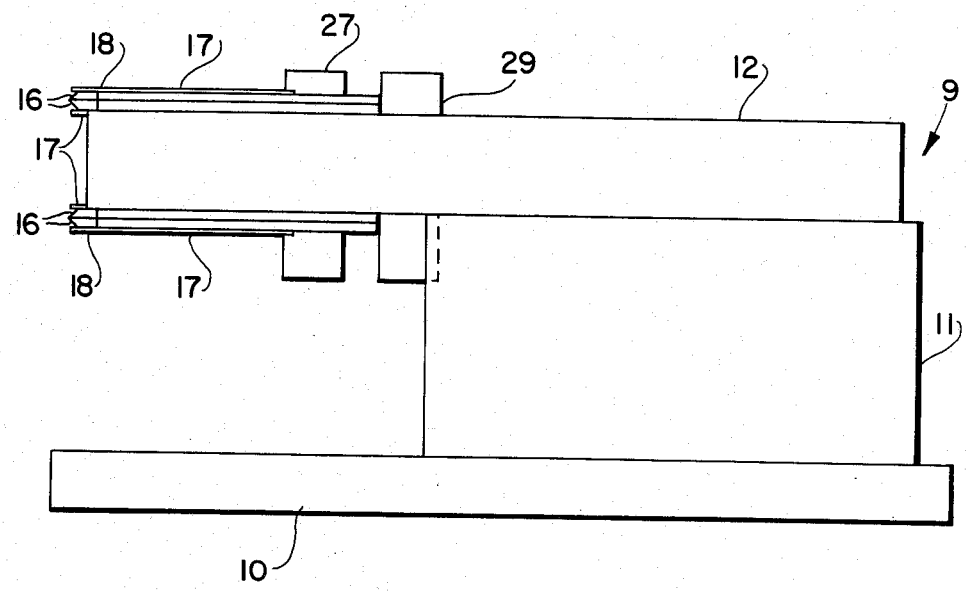
FIG. 2 is a side elevation of the tool assembly of FIG. 1.

Referring to FIGS. 1 and 2, the tool assembly 9 includes a base block 10, a spacer bar 11 and a support plate 12. The support plate thickness dimension is selected to place the glass covered alignment plates 15 at the same center to center separation as adjacent disks on a drive that is simulated by the tool, while the thickness of the glass surfaced alignment plate 15 is the same as a disk used with the cooperating head assembly of such a drive.

The alignment plate 15 includes 45 degree inclined edge surfaces 16 which are polished to present a mirror finish. Overlying a portion of each major surface of alignment plate 15 is a glass sheet 17 which has a grid 19 (FIG. 4) etched on the outer surface. Alignment plate 15 is formed of half hard 302 stainless steel. This material was selected because it is not brittle if bumped, it is corrosion resistant and non-magnetic, will support the glass sheets at either side and can be polished to a good surface without chipping or cracking.

Figure 3:
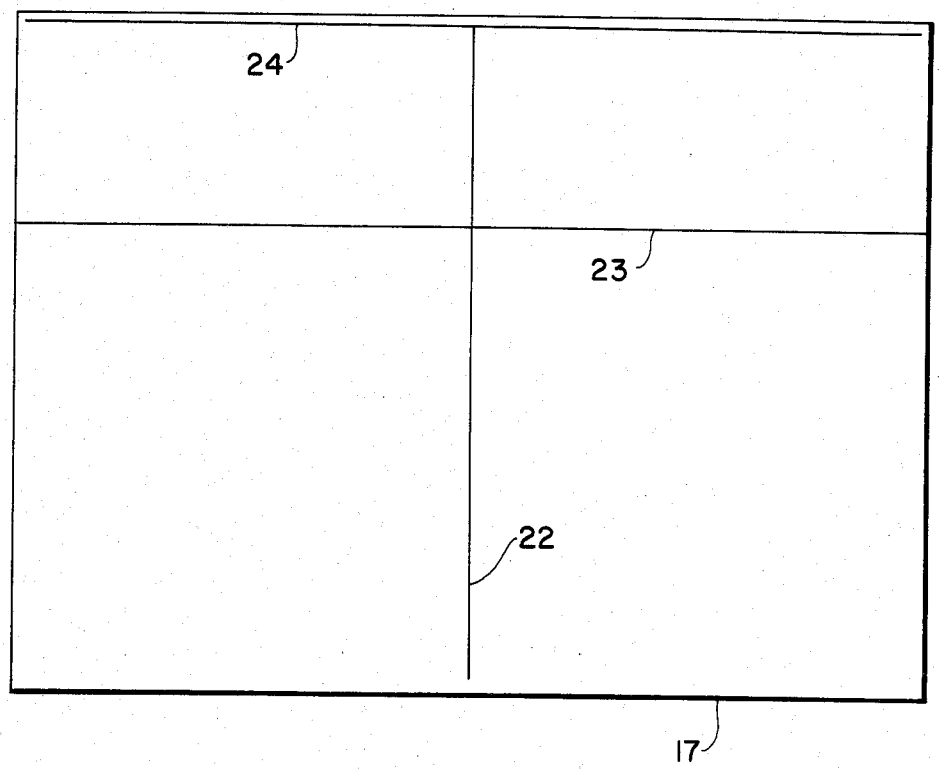
FIG. 3 is an enlarged plan view of the alignment plate portion of the tool assembly of FIG. 1.
Figure 4:
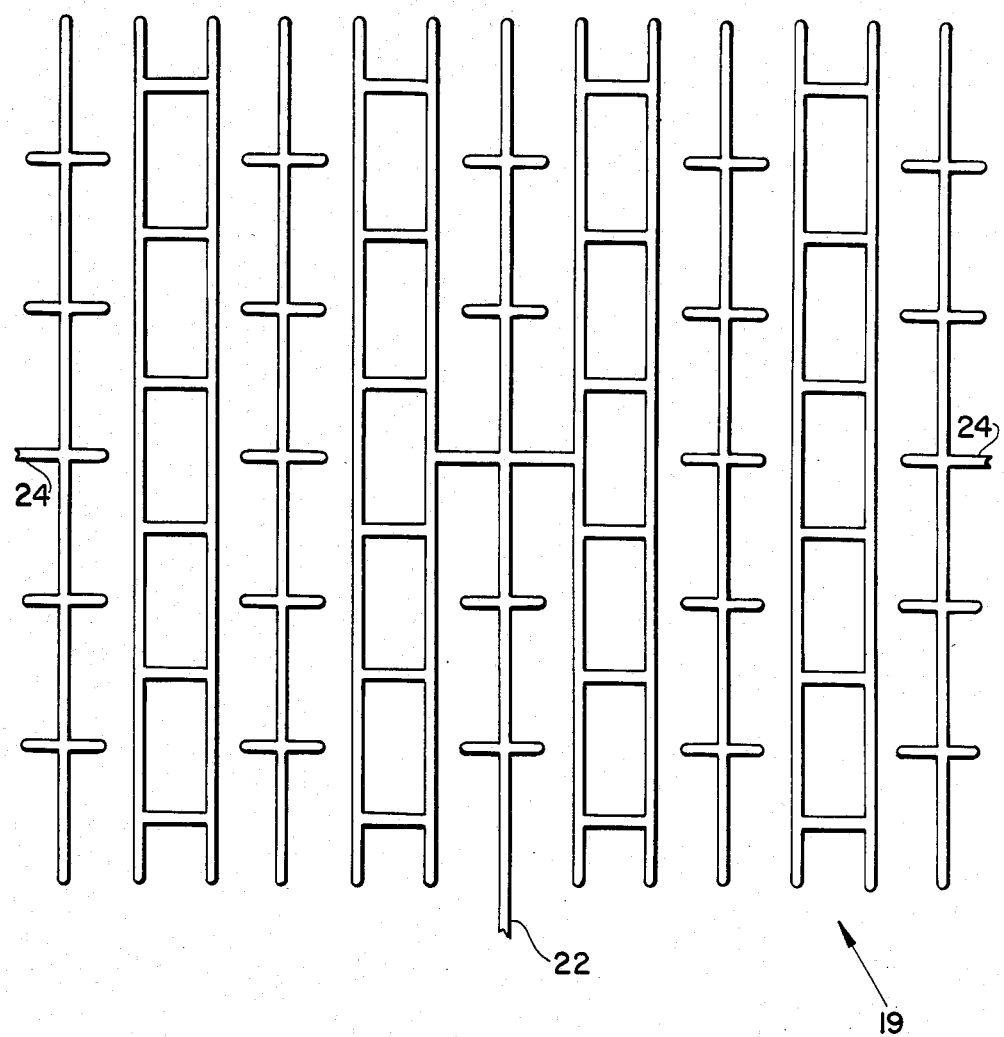
FIG. 4 is an enlarged view of the grid etched on the glass surface which in actual size is approximately 0.3 millimeter square.

The glass sheets 17 are secured to the alignment plate and have the grid markings etched on the outer surfaces. With the grid at the surface that interfaces with the transducer gap, no parallax occurs. FIGS. 3 and 4 illustrate the etched grid structure. Line 22 represents a radial line with respect to which the transducer gap would be aligned for optimum performance. Line 23 intersects line 22 with the intersection overlying the circular opening 25 in alignment plate 15. The intersection of the etched lines 22 and 23 is used to obtain the uniform alignment of the grids 19 on the tool assembly. Line 24 overlies the mirrored surfaces 16 of alignment plate 15 and the grid shown in FIG. 4 is formed at the intersection of lines 22 and 24. This grid is approximately 0.3 millimeters square overall. Intersecting lines 22, 24 can be followed by an observer or operator using a bright field illuminated microscope to locate the etched grid.

The support plate 12 has locating pins 27, 28, 29 mounted thereon to provide precise positioning of the alignment plate 15. The alignment plates 15 are maintained in tangential contact with the locating pins 27, 28, 29 and are secured to support plate 12 by screws 30.

The etched grid 19, as shown in FIG. 4 is a sequence of lines and the line segments with a spacing of 0.025 millimeter between centers. The lines are etched without filling. Lines formed by material applied to the glass surface or lines that are etched and filled with material both permit material to be rubbed off causing contamination. Further, with unfilled etched lines, the unetched portion is transparent and the etched surface portions are translucent allowing the transducer gap to be observed whether aligned with or disposed between grid lines.

Figure 7:
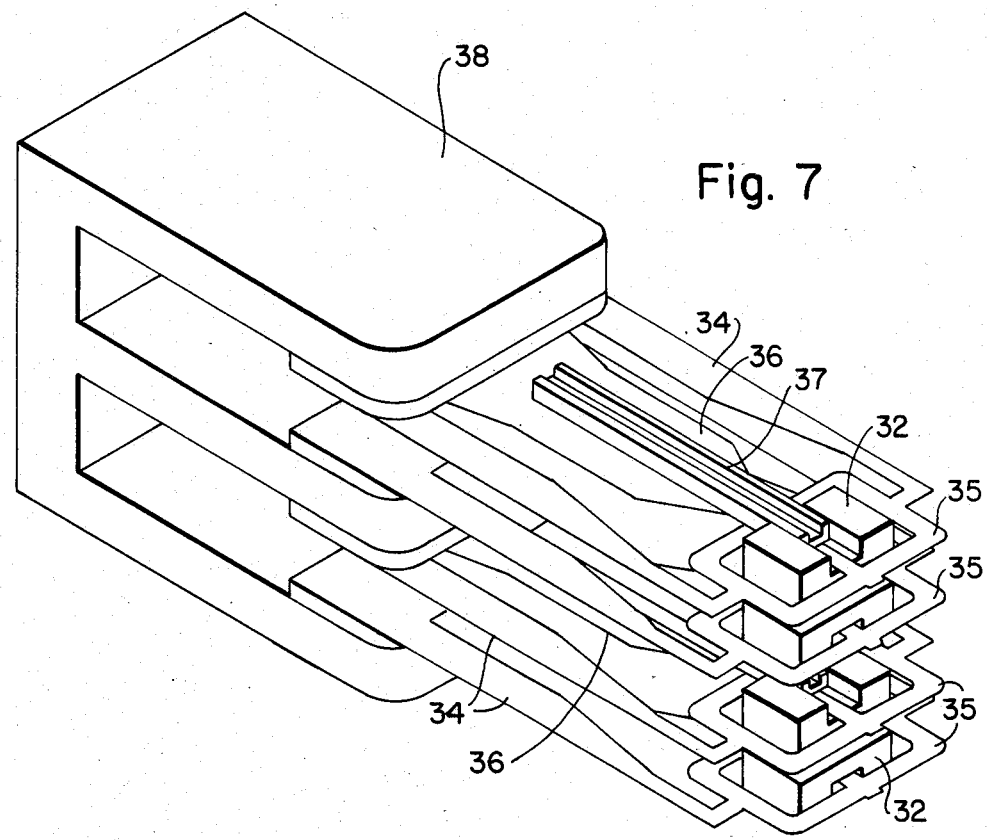
FIG. 7 is an illustration of a typical disk file transducer head mounting assembly.

FIG. 7 shows a typical transducer head and carriage structure with four transducer heads, each having a gimbal connection to a flexure mounting from a common support assembly. The sliders 32 are each mounted on a flexure member 34 which includes a gimbal structure 35 at the distal end to which the slider is attached. A second flexure portion 36 carries a load beam 37 which abuts the slider to urge confronting transducer head assemblies toward one another and toward the surface of a magnetic disk that is positioned therebetween in the operating condition. The flexure mounted head assemblies are each secured to a common body 38.

Figure 5:
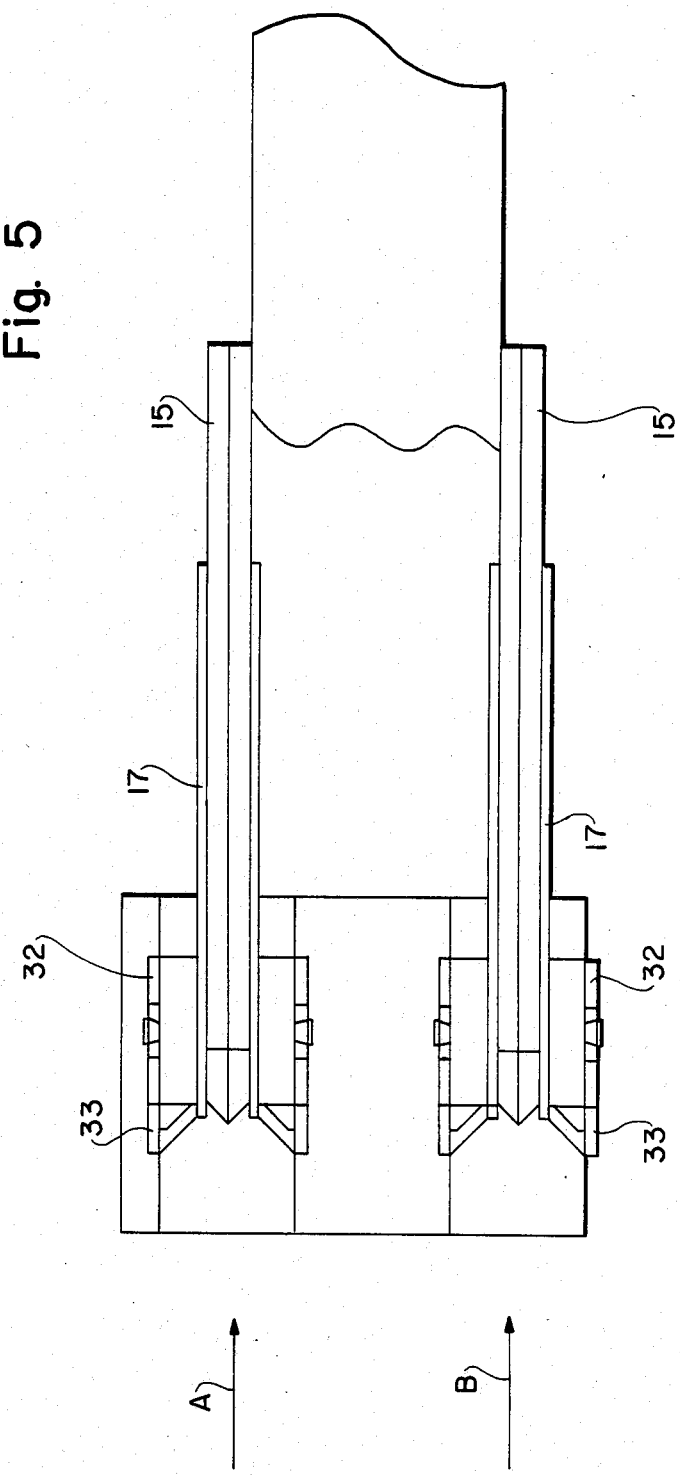
FIG. 5 is an elevation view of a portion of the tool assembly shown with opposed transducer heads at each alignment plate surface.
Figure 6:
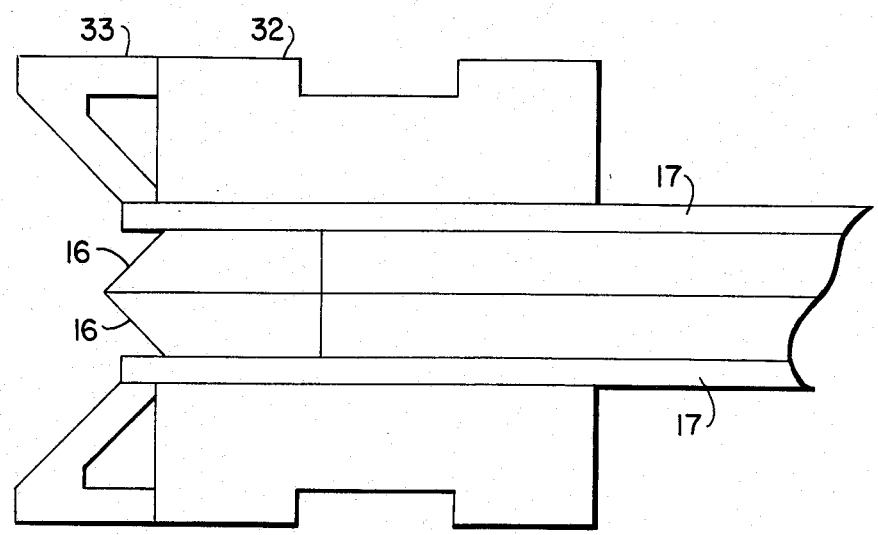
FIG. 6 is an enlarged view of one alignment plate with operatively positioned transducer heads.

In use the tool assembly 9 is disposed with respect to the transducer carriage assembly under test as shown in FIGS. 6 and 7. The alignment plates have replaced the spindle mounted disks with the transducers of the assembly positioned with the transducing gaps between sliders 32 and core pieces 33 overlying the inclined mirrored surfaces 16 and in contact with the surfaces 18 of glass sheets 17. In this position, the location of the transducer gaps with respect to the grid 19 can be observed by using a bright field illuminated microscope disposed to view the reflected image of the grid from mirrored surfaces 16, in the direction indicated by arrows A and B (FIG. 5). By observing the gaps at a 90 degree angle, it is possible to see each of the gaps of the two pairs of confronting transducer heads without moving either the tool or the transducer mounting carriage. With the precision alignment of the grids and 0.025 millimeter graduations within the field of the grid, it is possible to accurately confirm the alignment or to align the transducer gaps through adjustment of the head.

In the environment of a servowriter for writing the permanent data on rigid disk files, the tool assembly 9 is located in the servowriter in the position that would be occupied by a file to be servowritten. In place of the rotating disks mounted on a spindle in a typical file, the servowriting heads are received against the glass surfaces of the alignment plate assemblies with the transducer gaps overlying the etched grid. The grid presents lines or features every 0.025 millimeters (approximately each 0.001 inch). The grid is etched in the same surface on which the head is loaded. Since the grid and transducer gap are in the same plane, the gap may be viewed using a 50 to 100 power microscope without parallax. Gap-head location can be measured and adjusted if so desired, knowing the grid location and alignment or the gap location between servowriters compared.

What is claimed is:

1. A magnetic disk transducer gap alignment apparatus for simulating the head positioning of a disk drive and for aligning opposed transducer heads which are to be positioned in such disk drive in operative confronting relation to the disk surfaces comprising:
   a tool body;
   a tool mounted on said tool body, having major surfaces separated by a distance which positions opposed transducer heads at a like distance of separation as occurs during operation in a disk drive being simulated;
   said tool having a core to which a layer of glass is bonded on each major surface and which presents a pair of intersecting, reflecting surfaces over which said layers of glass extend; and
   a grid formed on a surface of each of said glass layers which overlies each said respective reflecting surface with such grids being aligned with respect to the disk drive being simulated by said alignment apparatus;
   whereby opposed transducer heads positioned against said tool glass surfaces can be observed using the reflective surfaces and adjusted to present transducer gaps at predetermined positions by adjusting the alignment of said gaps with respect to the confronting grid.

2. The transducer gap alignment apparatus of claim 1 wherein said grids are formed at the outer surfaces of said tool glass layers which contact the transducer heads whereby during adjustment both grid and gap appear in the same plane and minimal parallax occurs.

3. The transducer gap alignment apparatus of claim 2 wherein said gap is small in comparison to the area of said glass layer that extends over said reflecting surfaces and said glass surface has one or more lines extending from the grid area whereby an observer can visually follow one of said extending lines to locate said grid.

4. The transducer gap alignment apparatus of claim 2 wherein said core is formed of stainless steel having polished intersecting surfaces which form the reflecting surfaces.

5. The transducer gap alignment apparatus of claim 2 wherein the drive being simulated has a plurality of disks and said apparatus has a plurality of said tools mounted on said body with a separation therebetween equivalent to the axial spacing of the plurality of disks in said drive being simulated.

6. The transducer gap alignment apparatus of claim 5 further comprising alignment means for positioning said plurality of tools mounted on said tool body.

7. The transducer gap alignment apparatus of claim 6 wherein said alignment means includes an opening formed in the core of each of said tools, intersecting lines formed on each of the glass surfaces of said tools respectively overlying said openings with each intersecting line having the same alignment with the associated grid on the same glass surface whereby axially aligning the intersecting lines of said plurality of tools effect alignment of said grids on said tools.

8. The transducer gap alignment apparatus of claim 2 wherein said grids are formed by etching the surface of said glass layer and said etched portions are unfilled to allow such etched portions to be translucent.

9. A transducer head gap alignment apparatus for positioning a transducer gap in a predetermined, operating position comprising:
   a tool body; and
   a tool that has a core to which is adhered a generally planar layer of transparent material and is mounted on said tool body to present an upper surface of said transparent material layer at the operation position of the transducer gap to be aligned;
   said tool having a reflective surface adjacent a lower, opposite surface of said transparent layer, said reflective surface being inclined to the plane of the transparent layer upper surface and a grid formed on said transparent material which overlies said reflective surface,
   wherby a transducer gap positioned against said tool glass surface can be observed using the reflective surface and adjusted to present the transducer at a predetermined, operating position by adjusting the alignment of said gap with respect to the confronting grid.

10. The transducer head gap alignment apparatus of claim 9 wherein said tool has a glass layer bonded to a metal core element, said reflective surface is a polished surface formed on said core and said grid is etched in the surface of said glass layer that contacts said transducer head.

11. The transducer head gap alignment apparatus of claim 10 wherein said tool core element is formed of stainless steel.

12. The transducer head gap alignment apparatus of claim 10 wherein said glass surface etched portion is unfilled to have said grid formed of transparent and translucent surface portions.

13. The transducer head gap alignment apparatus of claim 12 wherein at least one of the lines forming said grid is extended away from the grid area on the glass surface whereby an observer may intercept said at least one line and track such line to the grid area.

* * * * *